US008289537B2

(12) United States Patent
Sekine

(10) Patent No.: US 8,289,537 B2
(45) Date of Patent: Oct. 16, 2012

(54) TRANSLATING PDL-BASED PRINT STREAM TO JOB TICKET-BASED PRINT STREAM

(75) Inventor: Hitoshi Sekine, Los Altos, CA (US)

(73) Assignee: Ricoh Company, Ltd., Tokyo (JP)

( * ) Notice: Subject to any disclaimer, the term of this patent is extended or adjusted under 35 U.S.C. 154(b) by 1523 days.

(21) Appl. No.: 11/701,021

(22) Filed: Jan. 31, 2007

(65) Prior Publication Data

US 2008/0180728 A1    Jul. 31, 2008

(51) Int. Cl.
G06F 3/12    (2006.01)
(52) U.S. Cl. .................. 358/1.15; 358/1.1; 358/1.13
(58) Field of Classification Search ............. 358/1.15, 358/1.1
See application file for complete search history.

(56) References Cited

U.S. PATENT DOCUMENTS

| 5,619,623 A * | 4/1997 | Takayanagi et al. ......... 358/1.15 |
| 6,519,053 B1 | 2/2003 | Motamed et al. |
| 2004/0036908 A1* | 2/2004 | Yagita et al. ................ 358/1.15 |
| 2004/0190032 A1* | 9/2004 | Ferlitsch ...................... 358/1.13 |
| 2004/0243934 A1* | 12/2004 | Wood et al. ..................... 715/517 |
| 2005/0223309 A1* | 10/2005 | Lee et al. ...................... 715/500.1 |
| 2006/0023244 A1* | 2/2006 | Mitsui ........................... 358/1.13 |
| 2006/0077456 A1* | 4/2006 | Aoki ............................. 358/1.15 |
| 2006/0232818 A1* | 10/2006 | Hino et al. .................... 358/1.15 |
| 2007/0002356 A1* | 1/2007 | Ha ................................. 358/1.13 |
| 2007/0133030 A1* | 6/2007 | Kanamoto .................... 358/1.13 |

FOREIGN PATENT DOCUMENTS

| EP | 1 220 085 A2 | 7/2002 |
| JP | 2003-237184 | 8/2003 |
| JP | 2006-301741 | 11/2006 |

OTHER PUBLICATIONS

Nakagawa Isamu, (Job Account System, Job Account Method, Job Account Program and Storage Medium, Nov. 7, 2003, (JP 2003316554 A).*
European Patient Office, European Patent Office Action dated Dec. 9, 2010; Application No. 07 150 027.6 -1245, 5 pages.

* cited by examiner

Primary Examiner — Benny Q Tieu
Assistant Examiner — Martin Mushambo
(74) Attorney, Agent, or Firm — Hickman Palermo Truong Becker Bingham Wong LLP; Edward A. Becker

(57) ABSTRACT

Using techniques described herein, separate "job ticket" data and printable data may be generated automatically from a PDL-compliant print stream. According to one technique, an automated mechanism receives a PDL-compliant print stream as input. The PDL-compliant print stream describes both printable content and control data, as described above. The automated mechanism separates the printable content data from the control data. The automated mechanism may translate the printable content data from a printer definition language into a format that is designed to be understood by human beings. The automated mechanism generates two separate "packages" of data; one "package" describes the printable content, and the other "package," the "job ticket," describes the control data. Thus, in one embodiment of the invention, the automated mechanism separates the PDL-compliant print stream into a "job ticket" and printable content data. The "job ticket" may be stored separately from the printable content data.

18 Claims, 5 Drawing Sheets

TRANSLATING PDL-BASED PRINT STREAM TO JOB TICKET-BASED PRINT STREAM

FIELD OF THE INVENTION

The present invention relates to printers, and more particularly to translating a printer definition language (PDL)-based print stream into a job ticket-based print stream.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A printer definition language (or, alternatively, "page description language") (PDL) is a language that describes the contents of a printable page at a higher level than the level at which an actual bitmap would describe those contents. Some examples of printer definition languages include Advanced Function Presentation (AFP), Diablo, Device Independent (DVI), Eltron Programming Language (EPL), ESC/P2, Intelligent Printer Data Stream (IPDS), Metacode, Printer Command Language (PCL), Portable Document Format (PDF), PostScript, Personal Printer Data Stream (PPDS), Scalable Vector Graphics (SVG), and XSL Formatting Objects (XSL-FO).

A print stream contains information that a printing device (e.g., a printer, copying machine, or multi-function peripheral) receives and uses to print content on print media (usually paper of some kind). When such information is described in a printer definition language, the print stream that contains that information is a PDL-compliant print stream.

Typically, a PDL-compliant print stream contains two kinds of data: (1) the data that describes the content of the text and/or images that are actually to be printed and seen on the resulting printed page and (2) control data that describes other attributes of the printing task or job, but that is independent of the content itself. Examples of attributes that might be described within control data include paper size (and/or input tray), printer identity, whether the content is to be printed in color or grayscale, resolution (e.g. in dots per inch), and the number of copies to be printed. In many cases, the control data describes printing device-dependent attributes; the specific PDL in which the control data are expressed may depend on the set of PDLs that the target printing device is configured to interpret. The same printable content could be printed at different times and locations with different print control attributes.

For example, a first PDL-compliant print stream might describe a particular image (the content) and first control data that indicates that the particular image is to be printed at 300 dpi on letter-size paper in grayscale, while a second PDL-compliant print stream might describe the same particular image and second control data that indicates that the particular image is to be printed at 600 dpi on A4-size paper in color. In this example, the first and second PDL-compliant print streams both describe the same particular image, but the print streams describe very different control data. The control data in each print stream may influence the way that the resulting printed image appears, but the data that describes the actual image is the same in both print streams.

In a PDL-compliant print stream, the control data is usually formatted in a manner that is not designed for human consumption, since only the printing device itself needs to understand the control data. Most human beings would have considerable difficulty trying to decipher the meaning of the control data that is contained within a PDL-compliant print stream, especially since the control data expressed in one PDL may look vastly different from the same control data when expressed in another PDL.

Sending both the content-describing data and the control data in a single print stream typically is suitable in environments in which printing is an informal, secondary concern, such as at homes and at businesses that are not primarily in the business of printing documents in exchange for monetary compensation. Consequently, PDL-compliant print streams are commonly used to print documents in these environments. When produced by operating systems that execute on desktop computers that are used in these environments, print streams usually are PDL-compliant print streams.

However, the printing industry, including businesses whose primary concern is printing documents in exchange for monetary compensation, typically do not deal with PDL-compliant print streams. In contrast, such printing businesses typically generate two separate "packages" of information to describe a print task or job; one "package" describes the printable content but not the control data, and the other "package" describes the control data but not the printable content. Because the printable content and the control data are maintained in separate "packages," employees of printing businesses can more easily modify the attributes described in the control data without affecting the printable content. Employees of printing businesses often find it necessary to modify such attributes in order to satisfy customer requirements, to make the best use of the available printing resources, and to produce a finished product that is of the highest possible quality.

In order to allow easy modification of the attributes, the "package" that describes the control data usually represents the attributes in a manner that human beings can read and understand. Indeed, human beings often are the entities that generate the control data under the circumstances described. The "package" that describes the control data is called the "job ticket."

Because the relatively affordable desktop systems that are used in less print-intensive environments usually produce only PDL-compliant print streams, in which the printable content data is mixed with the control data, the printing industry may be hesitant to adopt these desktop systems, despite the affordability of these desktop systems. The difficulty that employees of print-focused businesses might have in understanding and modifying the control data contained within PDL-compliant print streams could prevent such businesses from using affordable desktop systems (and the software that executes on such systems) to generate print streams. Indeed, because the difficult-to-understand control data is mixed with the printable content in PDL-compliant print streams, a human being's attempt to modify the control data in a PDL-compliant print stream might often result in the human being accidentally corrupting the data that describes the printable content.

SUMMARY

Embodiments of the invention automatically generate separate "job ticket" data and printable data from a PDL-compliant print stream. According to one embodiment of the invention, an automated mechanism such as a computer program receives a PDL-compliant print stream as input. The PDL-compliant print stream describes both printable content and control data, as described above. The automated mechanism separates the printable content data from the control data. The automated mechanism may translate the printable content data from a printer definition language into a format that is designed to be understood by human beings. The automated mechanism generates two separate "packages" of data; one "package" describes the printable content, and the other "package," the "job ticket," describes the control data. Thus, in one embodiment of the invention, the automated mechanism separates the PDL-compliant print stream into a "job ticket" and printable content data. The "job ticket" may be stored separately from (e.g., in a different file) the printable content data.

Once generated, the "job ticket" and printable content data may be provided as input to a "job ticket-ready" printing device that prints the printable content in accordance with the print control attributes described within the "job ticket." Print control attributes within the "job ticket" can be modified manually as needed thereafter, without fear of disturbing the printable content data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Converting PDL-Based Stream Into Job Ticket-Based Stream

Figure 1:
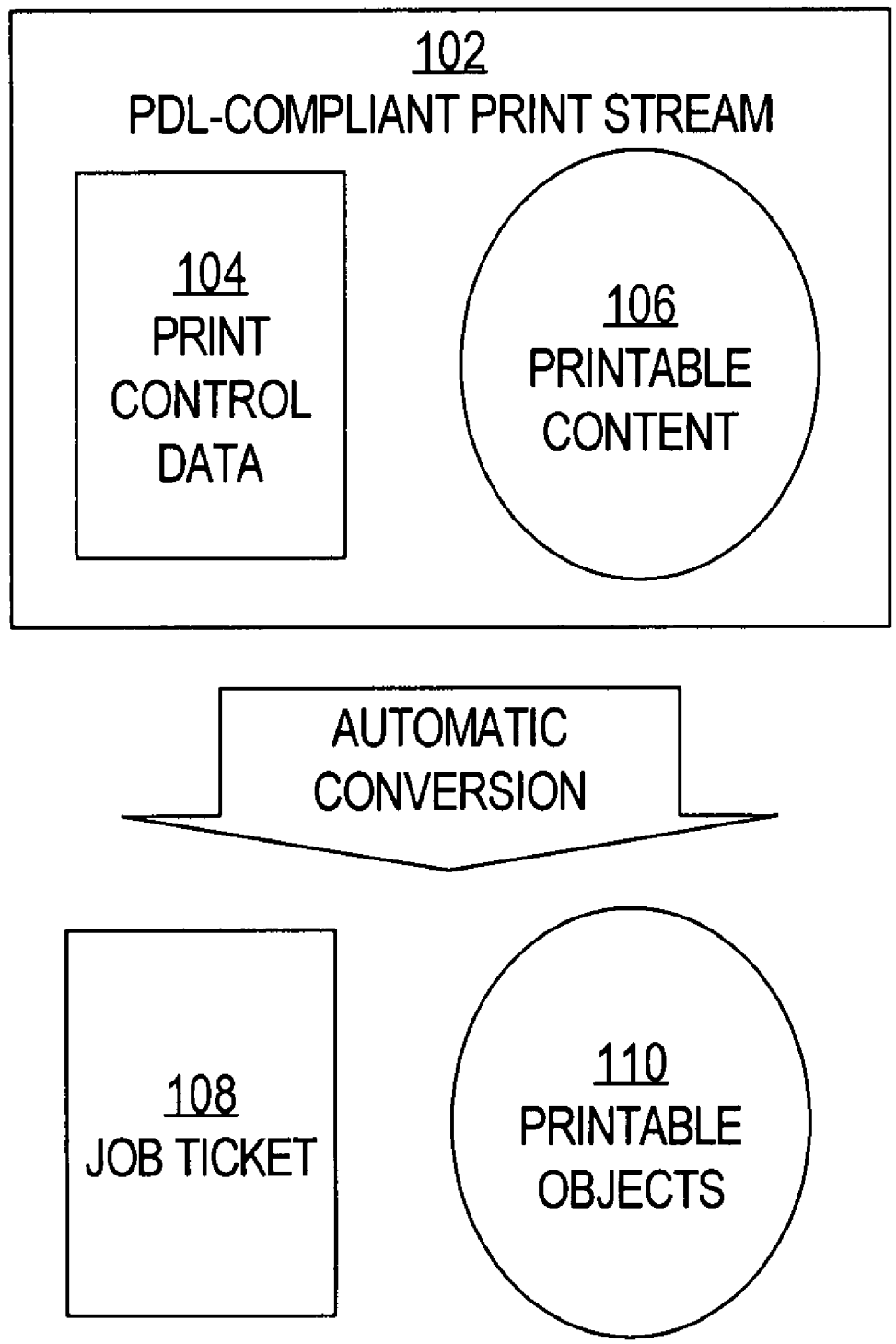
FIG. 1 is a block diagram that conceptually illustrates how a PDL-compliant print stream is converted into a job ticket and printable objects, according to an embodiment of the invention.

FIG. 1 is a block diagram that conceptually illustrates how a PDL-compliant print stream is converted into a job ticket and printable objects, according to an embodiment of the invention. As is shown in FIG. 1, a PDL-compliant print stream 102 comprises both print control data 104 and printable content 106. Print control data 104 is expressed in the terms and syntax of a PDL (e.g., PCL, PostScript, etc.). Through techniques described herein, PDL-compliant print stream 102 is automatically converted into a job ticket 108 and printable objects 110.

Job ticket 108 expresses the information that was contained in print control data 104, but in one embodiment, job ticket 108 does not express this information in the PDL in which print control data 104 expressed this information. Instead, job ticket 108 may express this information in terms and syntax that are designed to be read, understood, and modified by human beings.

Printable objects 110 expressed the information that was contained in printable content 106. Printable objects 110 may be stored separately from job ticket 108. Printable objects 110 may be stored in a file that is separate from a file in which job ticket 108 is stored. Job ticket 108 may be modified without modifying printable objects 110.

Example Technique

In one embodiment of the invention, if a print job received as input to the automated conversion mechanism already consists of a job ticket and separate printable data, then no conversion is performed relative to the print job. However, if the print job comprises a PDL-compliant print stream that includes both print control data and printable content data, then the print job is converted into a job ticket-based print job as described above.

Figure 2:
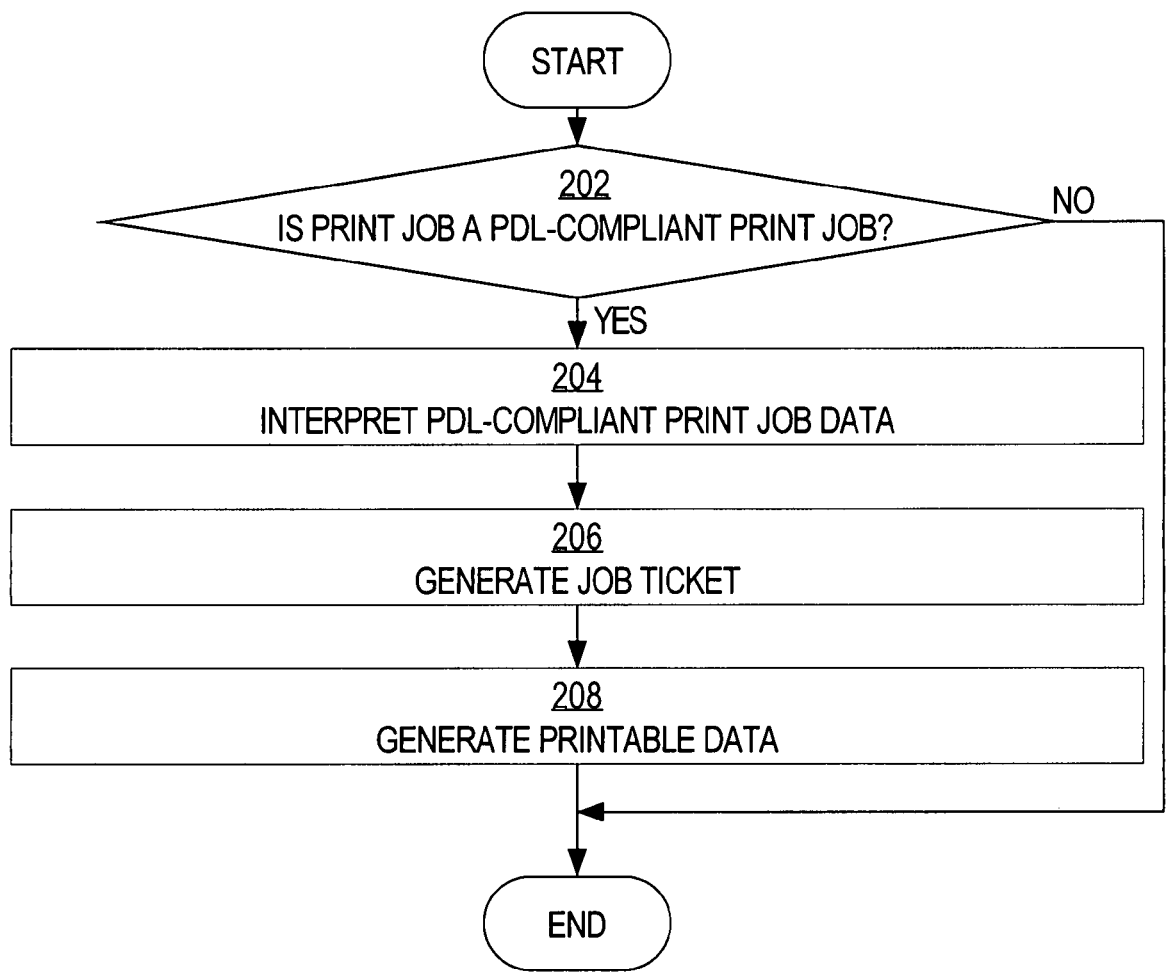
FIG. 2 is a flow diagram that illustrates an example of a technique for converting a PDL-compliant print stream into a job ticket and printable data, according to an embodiment of the invention.

FIG. 2 is a flow diagram that illustrates an example of a technique for converting a PDL-compliant print stream into a job ticket and printable data, according to an embodiment of the invention. The technique illustrated is one of many possible examples of various embodiments of the invention. Other embodiments may include more, fewer, or different steps than those illustrated in FIG. 2. In alternative embodiments of the invention, one or more of the steps may be performed in a different order. The technique described may be performed by a printer driver, a printer controller, a print job submission system, an application that prints, or any printing system, for example.

The performance of the technique begins in block 202. In block 202, a determination is made as to whether the print job (or print stream) is a PDL-compliant print job. This determination may involve determining whether print control data in the print job is expressed in a PDL. If the print job is a PDL-compliant print job, then control passes to block 204. Otherwise, the technique described with reference to FIG. 2 is finished.

In block 204, the PDL-compliant print job is automatically interpreted. In one embodiment of the invention, the interpreting involves locating, in a PDL control command table, each PDL command that is expressed in the PDL-compliant print job.

In block 206, a job ticket is automatically generated based on the print control data expressed in the PDL-compliant print job. In one embodiment of the invention, the generation of the job ticket involves writing, to a job ticket file, one or more commands that correspond to each PDL control command located in the PDL control command table. In one embodiment of the invention, the commands written to the job ticket file are located in a job ticket command table, and are not expressed in PDL. In one embodiment of the invention, the commands are expressed in Job Definition Format (JDF), which is an XML-based format.

In block 208, printable content data is automatically generated. The printable content data may be generated by extracting printable content data from the PDL-compliant print stream and writing that data into a file, which may be separate from a file to which job ticket commands were written. The technique described with reference to FIG. 2 is then finished.

As a result of the foregoing technique, a job ticket and separate printable data are automatically generated. The job ticket and the printable data may be stored and/or sent to a job ticket-ready printer for printing. The job ticket may be manually modified one or more times after being automatically generated. The job ticket may be modified in between times that the job ticket-based job is sent to printers. If necessary, the job ticket and the printable data may be merged into a PDL-compliant print stream, possibly after the job ticket has been modified.

Conversion-Performing Entities

Figure 3C:
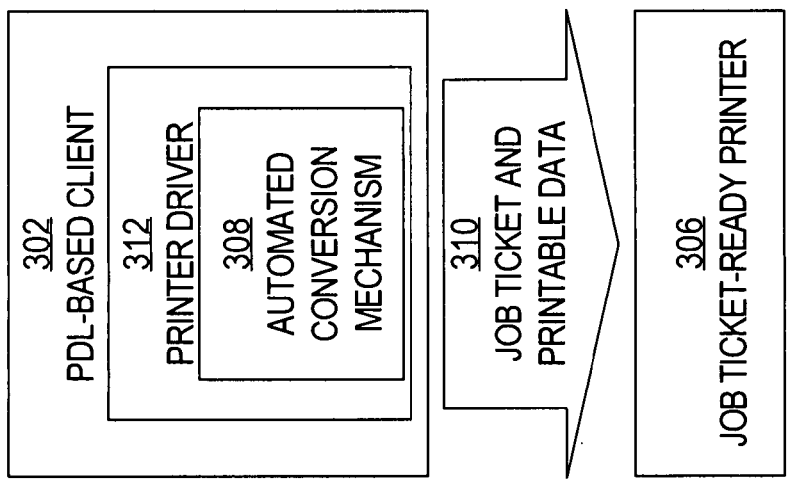
FIG. 3C illustrates a system in which the automated conversion mechanism is located within a printer driver at a PDL-based client, according to an embodiment of the invention.
Figure 3B:
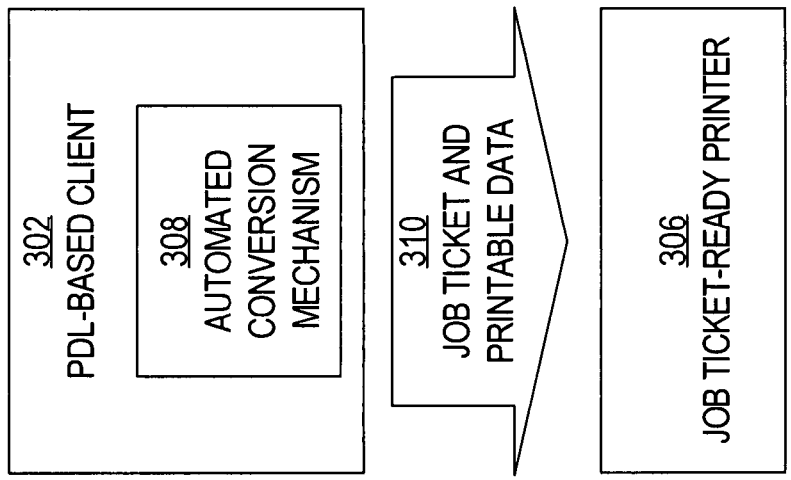
FIG. 3B illustrates a system in which the automated conversion mechanism is located at a PDL-based client, according to an embodiment of the invention.
Figure 3A:
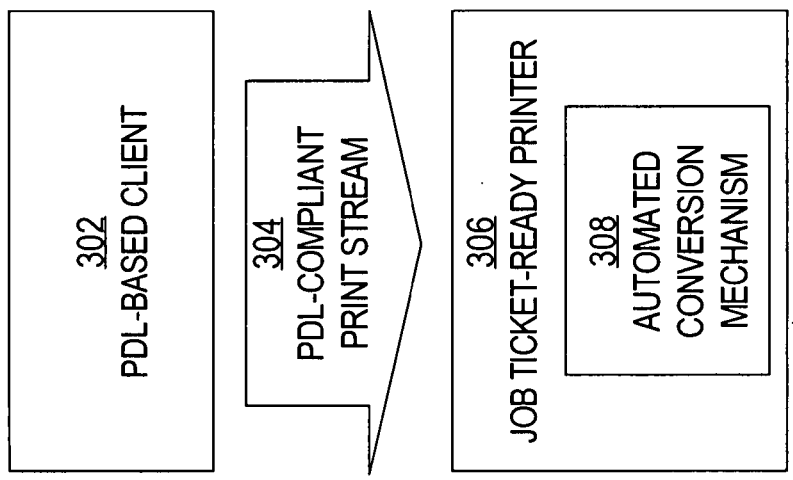
FIG. 3A illustrates a system in which the automated conversion mechanism is located in a job ticket-ready printer, according to an embodiment of the invention.

There is no limitation on where the PDL-compliant print stream-to-job ticket-based print stream may be performed. FIGS. 3A-C are block diagrams that illustrate different systems in which embodiments of the invention may be practiced. In each illustrated embodiment, the automated conversion mechanism is located in a different entity.

FIG. 3A illustrates a system in which the automated conversion mechanism is located in a job ticket-ready printer, according to an embodiment of the invention. FIG. 3A shows a PDL-based client 302, a PDL-compliant print stream 304, and a job ticket-ready printer 306. PDL-based client 302 may be a desktop computer on which a printable content-generating application executes, for example. Job ticket-ready printer 306 includes an automated conversion mechanism 308.

According to the embodiment of the invention depicted in FIG. 3A, PDL-based client 302 generates PDL-compliant print stream 304. PDL-based client 302 sends PDL-compliant print stream 304 to job ticket-ready printer 306. After receiving PDL-compliant print stream 304 from PDL-based client 302, job ticket-ready printer 306 routes the PDL-compliant print stream to automated conversion mechanism 308. In response to receiving PDL-compliant print stream 304, automated conversion mechanism 308 automatically converts PDL-compliant print stream 304 into a separate job ticket and printable data using techniques described above. Job ticket-ready printer 306 may then print the resulting printable data onto physical media based on the commands expressed in the job ticket.

An alternative embodiment of the invention is shown in FIG. 3B. FIG. 3B illustrates a system in which the automated conversion mechanism is located at a PDL-based client, according to an embodiment of the invention. Like FIG. 3A, FIG. 3B shows a PDL-based client 302 and a job ticket-ready printer 306. However, in FIG. 3B, automated conversion mechanism 308 is located at PDL-based client 302 instead of within job ticket-ready printer 306. For example, automated conversion mechanism 308 may be a process that executes on PDL-based client 302, assuming that PDL-based client 302 is a computer. Indeed, automated conversion mechanism 308 may even be integrated into the application that generates the printable data.

According to the embodiment of the invention depicted in FIG. 3B, PDL-based client 302 routes a PDL-compliant print stream to automated conversion mechanism 308. In response to receiving the PDL-compliant print stream, automated conversion mechanism 308 automatically converts the PDL-compliant print stream into a job ticket and printable data 310 using techniques described above. After the conversion has been performed, PDL-based client 302 sends job ticket and printable data 310 to job ticket-ready printer 306. Job ticket-ready printer 306 may then print the resulting printable data onto physical media based on the commands expressed in the job ticket.

Yet another alternative embodiment of the invention is shown in FIG. 3C. FIG. 3C illustrates a system in which the automated conversion mechanism is located within a printer driver at a PDL-based client, according to an embodiment of the invention. Like FIG. 3B, FIG. 3B shows a PDL-based client 302 and a job ticket-ready printer 306. However, in FIG. 3C, automated conversion mechanism 308 is located within a printer driver 312 that is located at PDL-based client 302, whereas, in FIG. 3B, automated conversion mechanism 308 was not located within a printer driver. Printer driver 312 may be a process to which all applications executing on the PDL-based client 302 send printable data to be printed, for example.

According to the embodiment of the invention depicted in FIG. 3C, PDL-based client 302 routes a PDL-compliant print stream to printer driver 312. Printer driver 312 routes the PDL-compliant print stream to automated conversion mechanism 308. In response to receiving the PDL-compliant print stream, automated conversion mechanism 308 automatically converts the PDL-compliant print stream into a job ticket and printable data 310 using techniques described above. After the conversion has been performed, PDL-based client 302 sends job ticket and printable data 310 to job ticket-ready printer 306. Job ticket-ready printer 306 may then print the resulting printable data onto physical media based on the commands expressed in the job ticket.

Thus, the automated conversion mechanism may be located in any of a variety of different entities and components that are involved in the printing process.

Example Translation System Detail

Figure 4:
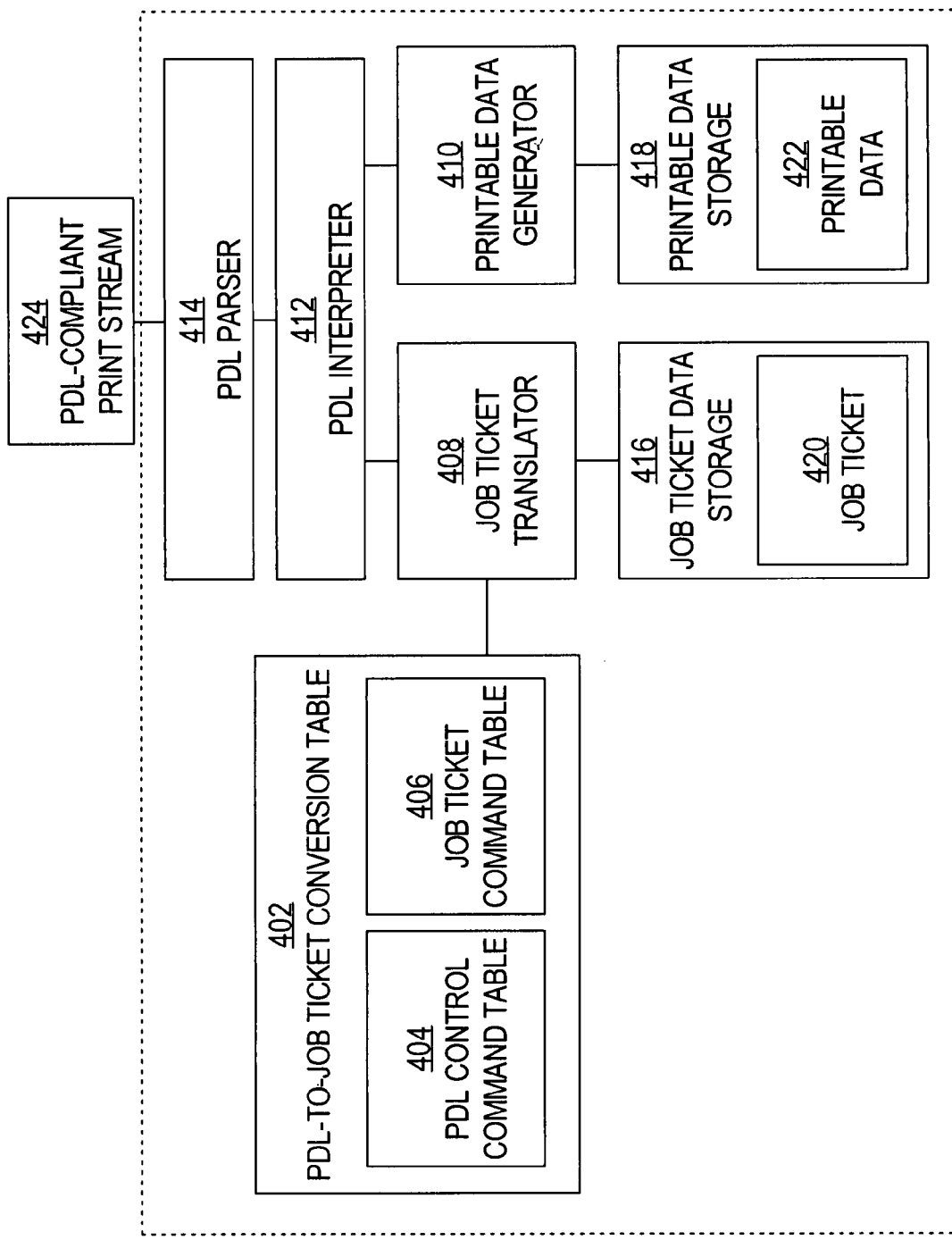
FIG. 4 is a block diagram that illustrates a more detailed example of a printing system in which an embodiment of the invention may be implemented.

FIG. 4 is a block diagram that illustrates a more detailed example of a printing system in which an embodiment of the invention may be implemented. The system shown in FIG. 4 is one example; embodiments of the invention may include more, fewer, or different components than those shown in FIG. 4. One or more of the components shown in FIG. 4 may be implemented within a single executable program, or within multiple separate executable programs. One or more of the components shown in FIG. 4 may be implemented as separate threads of execution of a single process.

FIG. 4 shows a PDL-to-job ticket conversion table 402, a job ticket translator 408, a printable data generator 410, job ticket data storage 416, and printable data storage 418. PDL-to-job ticket conversion table 402 comprises a PDL control command table 404 and a job ticket command table 406. PDL control command table 404 comprises entries that specify PDL commands, potentially from multiple different PDLs (e.g., PostScript, PCL, etc.). Job ticket command table 402 comprises entries that comprise, in one embodiment of the invention, non-PDL commands that are functionally equivalent to PDL commands in PDL control command table 404. In one embodiment of the invention, PDL-to-job ticket conversion table 402 comprises, for each entry in PDL control command table 404, a mapping from that entry to one or more corresponding entries in job ticket command table 406.

According to one embodiment of the invention, PDL parser 414 reads or otherwise receives PDL-compliant print stream 424 as input. PDL parser 414 parses the PDL-compliant print stream and provides the parsed stream to PDL interpreter 412. PDL interpreter 412 interprets the PDL print control commands in the stream and provides those commands to job ticket translator 408.

According to one embodiment of the invention, for each PDL print control command in the stream, job ticket translator 408 looks up, in PDL control command table 404, an entry that specifies that command. For each such entry, job ticket translator 408 follows the mappings between that entry and one or more corresponding entries in job ticket command table 406. For each corresponding entry in job ticket command table 406, job ticket translator 408 reads the functionally equivalent non-PDL command from that entry and writes that functionally equivalent non-PDL command to a job ticket 420, which job ticket translator stores in job ticket data storage 416.

For example, PDL-compliant print stream 424 might contain PDL commands as follows:

?&126A
?&1100X
?&14H

The above commands might functionally represent commands to set the paper size to A4, to set the number of copies to be printed to 100, and to set Tray 2 as the paper input tray for the print job, for example.

Based on the above PDL commands, job ticket translator 408 might generate job ticket 420 that contains functionally equivalent (i.e., designed and intended to cause a printing device to perform the same operations) XML based JDF commands as follows:

```
<psf:Feature name = "psk:PageMediaSize">
    <psf:Option name = "psk:ISOA4">
    <psf:/Option>P544
</psf:Feature>
<psf:ParameterInit name = "psk:PageCopyCount">
    <psf:Value xsi:type = "xs:Integer">100</psf:Value>
</psf:ParameterInit>
<psf:Feature name = "psk:InputTray">
    <psf:Option>
        <psf:ScoredProperty name = "psk:Tray">
            <psf:Value xsi:type = "xs:string">Tray 2</psf:Value>
        </psf:ScoredProperty>
    </psf:Option>
</psf:Feature>
```

The commands in the job ticket typically will be much more understandable by human beings than the equivalent commands specified in the PDL-compliant print stream. Consequently, human beings typically will find the modification of the commands in the job ticket to be much easier than the modification of the equivalent commands in the PDL-compliant print stream. Additionally, when the job ticket is structured with XML tags, the job ticket can be validated automatically against an XML schema to ensure that the job ticket is valid and well-formed, thereby avoiding errors.

At the same time that job ticket translator 408 is generating job ticket 420, printable data generator 410 may extract, from the stream interpreted by PDL interpreter 412, the data that represents the actual printable content (e.g., text and/or images). Printable data generator 410 stores, in printable data storage 418, data that represents this printable content, shown in FIG. 4 as printable data 422. Printable data 422 is separate from job ticket 420, and, in one embodiment of the invention, contains no print control commands of the kind that would be contained in PDL-compliant print stream 424 and job ticket 420. In one embodiment of the invention, job ticket data stored 416 and printable data storage 418 may occupy the same physical storage device (e.g., a hard disk drive or flash memory), but are located in logically separate files with different file names.

Implementation Mechanisms

Figure 5:
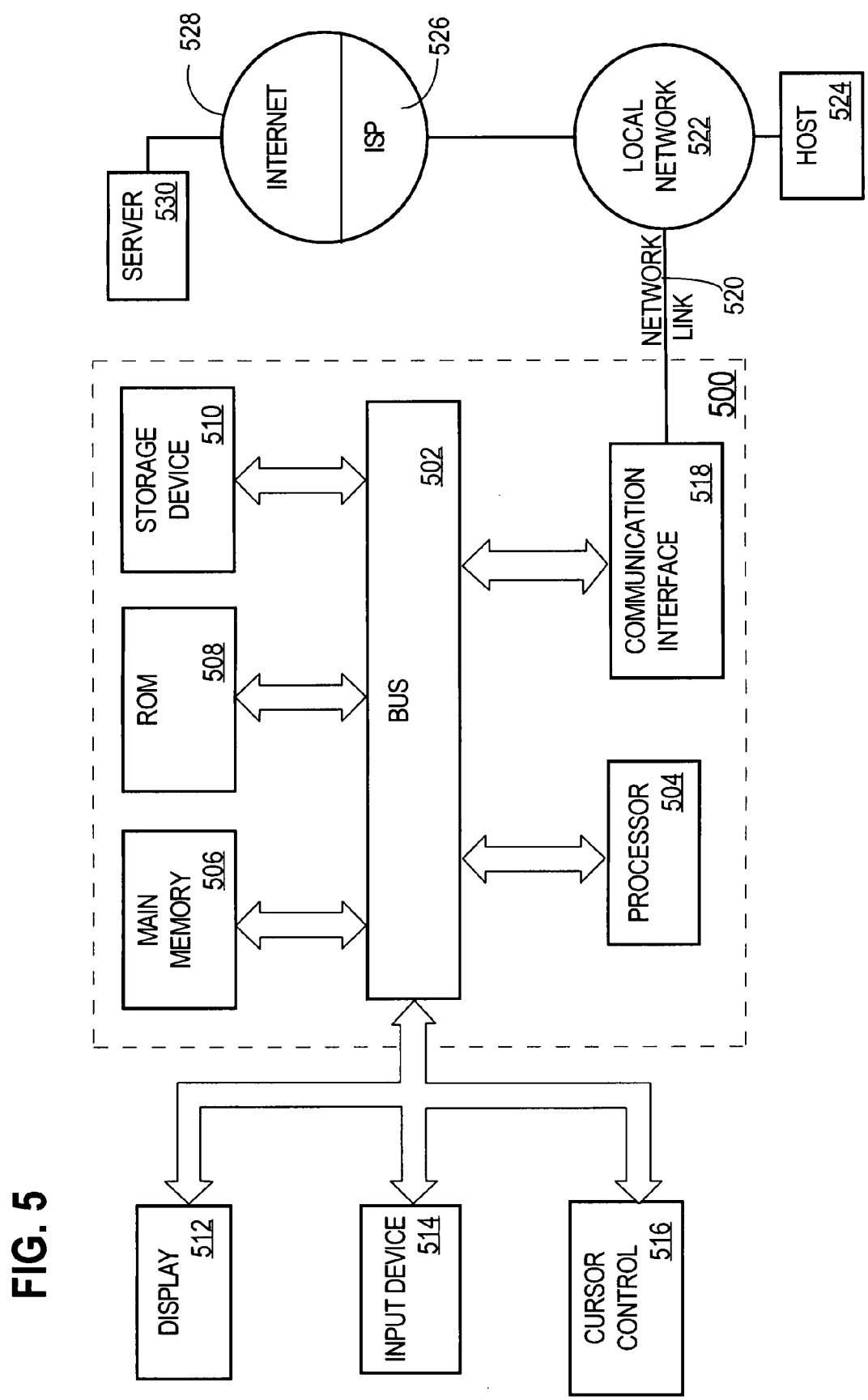
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing instructions which, when processed by one or more processors, cause:

receiving a PDL-compliant print stream;

automatically translating the PDL-compliant print stream into (a) print control data and (b) printable content data that is separate from the print control data;

storing the print control data in a first file that indicates one or more of dots-per-inch, paper size, or colorization; and storing the printable content data in a second file that is separate from the first file, that does not indicate dots-per-inch, that does not indicate paper size, and that does not indicate colorization;

wherein automatically translating the PDL-compliant print stream into print control data comprises translating one or more PDL commands in the PDL-compliant print stream into one or more functionally equivalent commands that are not PDL commands by:

locating, in a first table, a first entry that contains a particular PDL command that is specified in the PDL-compliant print stream;

determining a mapping between the first entry and one or more second entries in a second table, and writing, to a job ticket, one or more commands that are contained in the one or more second entries;

wherein the first file does not contain printable content data and indicates one or more of dots-per-inch, paper size, or colorization;

wherein the second file does not contain print control data, does not indicate dots-per-inch, does not indicate paper size, and does not indicate colorization;

wherein the method is performed by one or more computing devices.

2. The non-transitory computer-readable storage medium as recited in claim 1, wherein the one or more functionally equivalent commands are expressed in extensible markup language (XML).

3. The non-transitory computer-readable storage medium as recited in claim 1, wherein the one or more functionally equivalent commands are expressed in job definition format (JDF).

4. The non-transitory computer-readable storage medium as recited in claim 1, wherein the one or more functionally equivalent commands are expressed in a language that differs from a PDL in which the one or more PDL commands are expressed.

5. The non-transitory computer-readable storage medium as recited in claim 1, wherein automatically translating the PDL-compliant print stream further comprises:

automatically translating the PDL-compliant print stream within a printing device.

6. The non-transitory computer-readable storage medium as recited in claim 1, wherein automatically translating the PDL-compliant print stream further comprises:
   automatically translating the PDL-compliant print stream within a client device, and, after translating the PDL-compliant print stream, sending the print control data and the printable content data to a printing device.

7. The non-transitory computer-readable storage medium as recited in claim 1, wherein automatically translating the PDL-compliant print stream further comprises:
   automatically translating the PDL-compliant print stream within a printer driver, and, after translating the PDL-compliant print stream, sending the print control data and the printable content data to a printing device.

8. The non-transitory computer-readable storage medium as recited in claim 1, wherein the print control data specifies one or more settings for a printing device on which the printable content is to be printed, wherein the PDL-compliant print stream specifies the one or more settings, and wherein the printable content does not specify any settings for the printing device.

9. The non-transitory computer-readable storage medium as recited in claim 1, wherein the print control data specifies one or more attributes of media on which the printable content is to be printed, wherein the PDL-compliant print stream specifies the one or more attributes, and wherein the printable content does not specify any attributes of media on which the printable content is to be printed.

10. The non-transitory computer-readable storage medium as recited in claim 1, wherein automatically translating the PDL-compliant print stream into print control data further comprises:
    translating one or more PDL commands that are not designed to be understandable by a human being into one or more functionally equivalent commands that are designed to be understandable by a human being.

11. The non-transitory computer-readable storage medium as recited in claim 1, further storing additional instructions which, when processed by the one or more processors causes:
    receiving a second print stream that is not a PDL-compliant print stream;
    automatically determining whether the second print stream is a PDL-compliant print stream; and
    in response to determining that the second print stream is not a PDL-compliant print stream, passing the second print stream to a component without translating the second print stream.

12. The non-transitory computer-readable storage medium as recited in claim 1, wherein the print control data specifies a number of copies of the printable content to be printed.

13. The non-transitory computer-readable storage medium as recited in claim 1, wherein the print control data specifies a number of copies of the printable content is to be printed, and wherein the printable data does not specify the number of copies.

14. The non-transitory computer-readable storage medium as recited in claim 1, wherein the print control data specifies whether the printable data is to be printed in grayscale, and wherein the printable data specifies a multicolor image comprising colors other than gray.

15. The non-transitory computer-readable storage medium as recited in claim 1, wherein the print control data specifies a size of paper on which the printable content is to be printed, and wherein the printable data does not specify the size of the paper.

16. The non-transitory computer-readable storage medium as recited in claim 1, wherein the print control data specifies a particular input tray, of a plurality of input trays, from which a printing device is to draw media on which the printing device is to print the printable content, and wherein the printable data does not specify the particular input tray.

17. A computer-implemented method comprising:
    receiving a PDL-compliant print stream;
    automatically translating the PDL-compliant print stream into (a) print control data and (b) printable content data that is separate from the print control data;
    storing the print control data in a first file that indicates one or more of dots-per-inch, paper size, or colorization; and
    storing the printable content data in a second file that is separate from the first file, that does not indicate dots-per-inch, that does not indicate paper size, and that does not indicate colorization;
    wherein automatically translating the PDL-compliant print stream into print control data comprises translating one or more PDL commands in the PDL-compliant print stream into one or more functionally equivalent commands that are not PDL commands by:
       locating, in a first table, a first entry that contains a particular PDL command that is specified in the PDL-compliant print stream;
       determining a mapping between the first entry and one or more second entries in a second table, and
       writing, to a job ticket, one or more commands that are contained in the one or more second entries;
    wherein the first file does not contain printable content data and indicates one or more of dots-per-inch, paper size, or colorization;
    wherein the second file does not contain print control data, does not indicate dots-per-inch, does not indicate paper size, and does not indicate colorization.

18. A computing device executing one or more processes that perform:
    receiving a PDL-compliant print stream;
    automatically translating the PDL-compliant print stream into (a) print control data and (b) printable content data that is separate from the print control data;
    storing the print control data in a first file that indicates one or more of dots-per-inch, paper size, or colorization; and
    storing the printable content data in a second file that is separate from the first file, that does not indicate dots-per-inch, that does not indicate paper size, and that does not indicate colorization;
    wherein automatically translating the PDL-compliant print stream into print control data comprises translating one or more PDL commands in the PDL-compliant print stream into one or more functionally equivalent commands that are not PDL commands by:
       locating, in a first table, a first entry that contains a particular PDL command that is specified in the PDL-compliant print stream;
       determining a mapping between the first entry and one or more second entries in a second table, and
       writing, to a job ticket, one or more commands that are contained in the one or more second entries;
    wherein the first file does not contain printable content data and indicates one or more of dots-per-inch, paper size, or colorization;
    wherein the second file does not contain print control data, does not indicate dots-per-inch, does not indicate paper size, and does not indicate colorization.

* * * * *